(12) United States Patent  
Allen

(10) Patent No.: US 6,927,890 B2
(45) Date of Patent: Aug. 9, 2005

(54) IMAGE DISPLAY SYSTEM AND METHOD

(75) Inventor: William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/697,830

(22) Filed: Oct. 30, 2003

(65) Prior Publication Data

US 2005/0094237 A1     May 5, 2005

(51) Int. Cl.$^7$ ............................................ G02B 26/00
(52) U.S. Cl. ..................................... 359/237; 359/298
(58) Field of Search ............................... 359/237–239, 359/242, 298, 280; 348/51

(56) References Cited

U.S. PATENT DOCUMENTS

| | | | |
|---|---|---|---|
| 4,373,784 A | 2/1983 | Nonomura et al. | 349/145 |
| 4,811,003 A | 3/1989 | Strathman et al. | 345/88 |
| 5,146,356 A | 9/1992 | Carlson | 257/531 |
| 5,317,409 A | 5/1994 | Macocs | 348/751 |
| 5,557,353 A | 9/1996 | Stahl | 353/69 |
| 5,912,773 A | 6/1999 | Barnett et al. | 359/822 |
| 5,920,365 A | 7/1999 | Eriksson | 349/146 |
| 5,953,148 A | 9/1999 | Moseley et al. | 359/237 |
| 6,067,143 A | 5/2000 | Tomita | 349/143 |
| 6,118,584 A | 9/2000 | Van Berkel et al. | 359/463 |
| 6,393,145 B2 | 5/2002 | Betrisey et al. | 382/162 |
| 6,522,356 B1 | 2/2003 | Watanabe | 348/272 |
| 6,574,032 B1 * | 6/2003 | Roddy et al. | 359/290 |
| 2003/0020809 A1 * | 1/2003 | Gibbon et al. | 348/51 |
| 2003/0076325 A1 | 4/2003 | Thrasher | 345/443 |

OTHER PUBLICATIONS

Candice H. Brown Elliot et al., "Color Subpixel Rendering Projectors and Flat Panel Displays"; SMPTE Advanced Motion Imaging Conference; Feb. 27–Mar. 1, 2003; pp. 1–4.

* cited by examiner

Primary Examiner—Georgia Epps
Assistant Examiner—M. Hasan

(57) ABSTRACT

A system for displaying an image includes a first light modulator including a first pixel array oriented at a first angle, and at least a second light modulator including a second pixel array oriented at a second angle different from the first angle. The first pixel array is adapted to produce a first image portion oriented at the first angle, and the second pixel array is adapted to produce a second image portion oriented at the second angle. As such, the first image portion and the second image portion are combined to display the image.

38 Claims, 6 Drawing Sheets

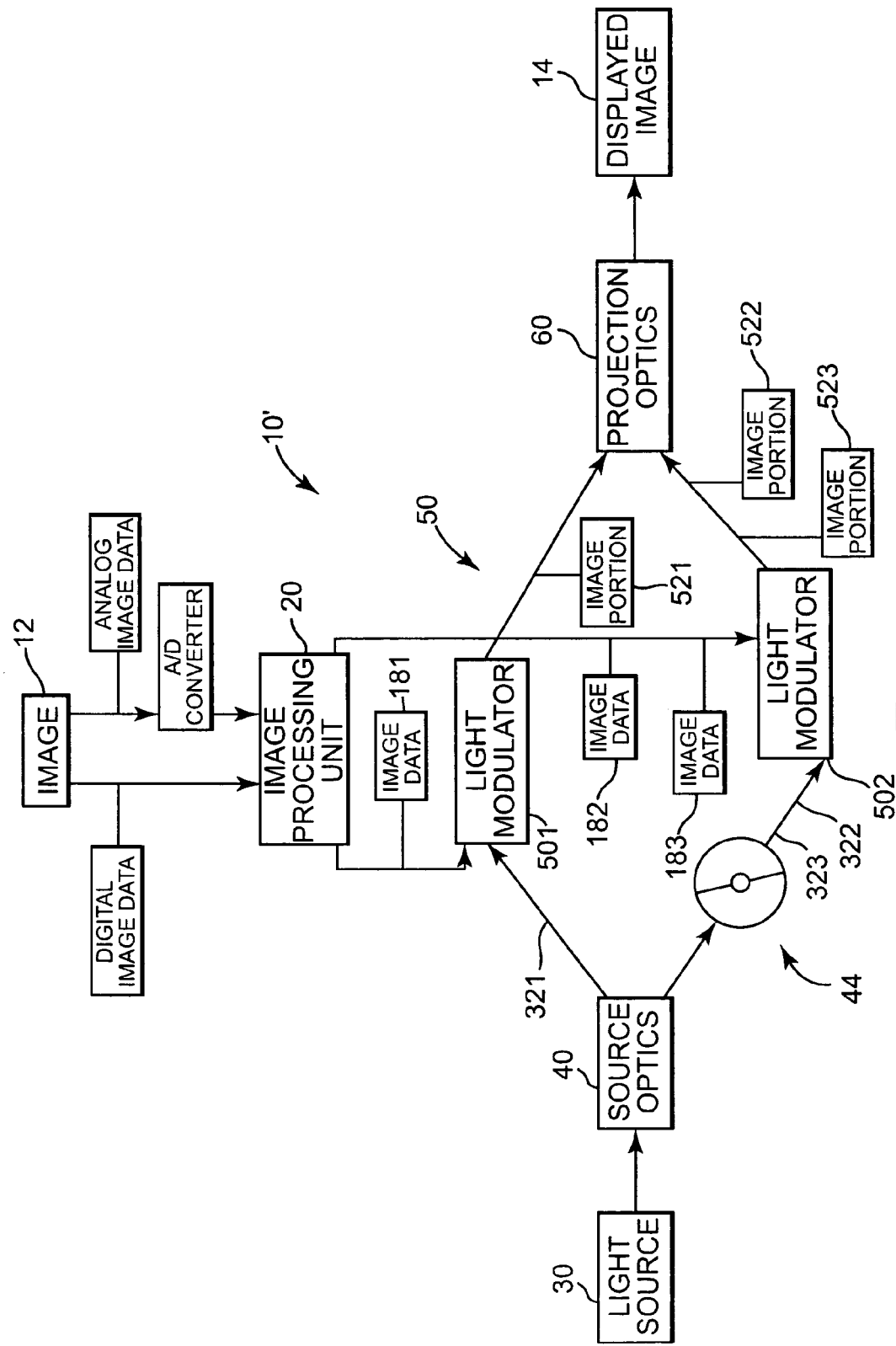

IMAGE DISPLAY SYSTEM AND METHOD

BACKGROUND

A conventional system or device for displaying an image, such as a display, projector, or other imaging system, produces a displayed image by addressing an array of individual picture elements or pixels. Typically, the array of individual pixels is arranged in horizontal rows and vertical columns. As such, horizontal and vertical gaps are often present between adjacent pixels of the array. These gaps result in a "screen door" effect with horizontal and vertical lines appearing between the adjacent pixels of the array. Unfortunately, these horizontal and vertical lines may be visible, thereby degrading quality of the image.

In addition, a conventional system or device for displaying an image may include separate arrays of individual pixels for displaying respective different colors of the image. The system or device may include, for example, separate arrays of individual pixels for displaying each of the colors red, green, and blue of the image. It is, however, often difficult to align the separate arrays relative to each other. Unfortunately, misalignment between the separate arrays may be visible, thereby also degrading quality of the image.

For these and other reasons, a need exists for the present invention.

SUMMARY

One aspect of the present invention provides a system for displaying an image. The system includes a first light modulator including a first pixel array oriented at a first angle, and at least a second light modulator including a second pixel array oriented at a second angle different from the first angle. The first pixel array is adapted to produce a first image portion oriented at the first angle, and the second pixel array is adapted to produce a second image portion oriented at the second angle. As such, the first image portion and the second image portion are combined to display the image.

BRIEF DESCRIPTION OF THE DRAWINGS

FIG. 6 is a block diagram illustrating another embodiment of an image display system according to the present invention.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
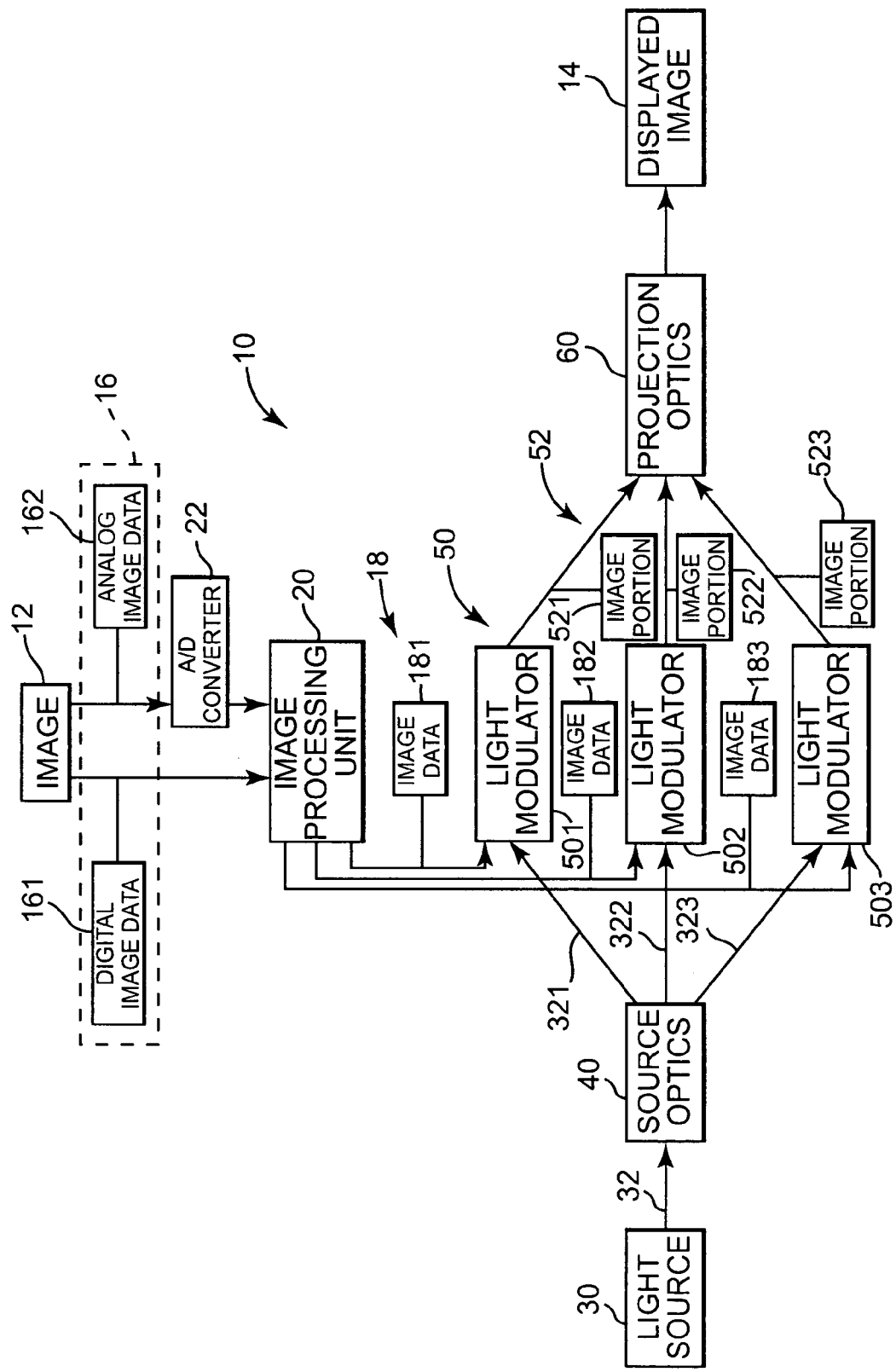
FIG. 1 is a block diagram illustrating one embodiment of an image display system according to the present invention.

FIG. 1 illustrates one embodiment of an image display system 10. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 may include individual picture elements or pixels of image 12. While one image is illustrated and described as being processed by image display system 10, it is understood that a plurality or a series of images may be processed and displayed by image display system 10.

In one embodiment, image display system 10 includes an image processing unit 20, a light source 30, illumination or source optics 40, light modulators 50, and projection optics 60. As described below, image processing unit 20 receives image data 16 for image 12 and creates image data subsets 18 for image 12. As such, light modulators 50 produce respective image portions 52 and projection optics 60 combine image portions 52 to produce displayed image 14.

Image display system 10, including, for example, image processing unit 20, includes hardware, software, firmware, or a combination of these. In one embodiment, one or more components of image display system 10, including, for example, image processing unit 20, are included in a computer, computer server, or other microprocessor based system capable of performing a sequence of logic operations. In addition, processing can be distributed throughout the system with individual portions being implemented in separate system components.

Image data 16 may include digital image data 161 or analog image data 162. In one embodiment, to process analog image data 162, image display system 10 includes an analog-to-digital (A/D) converter 22. As such, A/D converter 22 converts analog image data 162 to digital form for subsequent processing. Thus, image display system 10 may receive and process digital image data 161 and/or analog image data 162 for image 12.

In one embodiment, image processing unit 20 can receive and process image data 16 as progressive image data and/or interlaced image data. With progressive image data, image processing unit 20 receives and processes sequential fields of image data 16 for image 12. With interlaced image data, image processing unit 20 receives and processes odd fields and even fields of image data 16 for image 12.

Image processing unit 20 receives image data 16 for image 12 and creates image data subsets 18 for image 12. Image data subsets 18 may include individual lines or fields of image data 16. As such, image data subsets 18 may include one or more columns and/or one or more rows of individual pixels of image 12.

In one embodiment, image data subsets 18 include image data for different colors of image 12. As such, image processing unit 20 processes image data 16 and splits image data 16 into image data subsets 181, 182, and 183 representing the different colors of image 12. In one embodiment, for example, image data subset 181 includes red image data for image 12, image data subset 182 includes green image data for image 12, and image data subset 183 includes blue image data for image 12.

As described below, image data subsets 18 are oriented at different angles relative to each other. In one embodiment, one or more image data subsets 18 is oriented at a non-orthogonal angle. As such, image processing unit 20 processes image data 16 and generates image data subsets 18 at different angles relative to each other.

In one embodiment, input image data 16 is received in an orthogonal array pattern, and at least one of the light modulators 50 is oriented at a non-orthogonal angle. Thus, for each light modulator 50 oriented at a non-orthogonal angle, an alternate-angle representation of input image data 16 is generated. In one embodiment, standard computer graphics resampling techniques are used to generate alternate-angle representations of input image data 16.

In one embodiment, for example, given an orthogonal grid of data points, bi-linear interpolation can be used to compute a new data value for any arbitrary coordinate position within the orthogonal grid. As such, the alternate-angle representation constitutes an orthogonal grid that has been rotated so as to define a new set of data point coordinates that are angled and superimposed on top of the orthogonal input data grid. Thus, values for image data at each coordinate in the non-orthogonal grid are computed by bi-linear interpolation from the orthogonal array of input image data. In another embodiment, other resampling techniques, such as nearest neighbor or bi-cubic interpolation, may be used to generate alternate-angle representations of input image data 16. Techniques for generating alternate-angle representations of input image data are described, for example, in U.S. patent application Ser. No. 10/696,888 filed on even date herewith, entitled "Generating And Displaying Spatially Offset Sub-Frames On Different Types Of Grids", assigned to the assignee of the present invention and incorporated herein by reference.

In one embodiment, image data subsets 18 are oriented at non-orthogonal angles. For example, image data subset 181 is oriented at approximately 30 degrees, image data subset 182 is oriented at approximately 45 degrees, and image data subset 183 is oriented at approximately 60 degrees. In another embodiment, image data subsets 18 are oriented at orthogonal and non-orthogonal angles. For example, image data subset 181 is oriented at approximately zero degrees, image data subset 182 is oriented at approximately 45 degrees, and image data subset 183 is oriented at approximately 60 degrees.

In one embodiment, light source 30 generates a light beam 32 of white light and source optics 40 split light beam 32 into three separate light beams 321, 322, and 323. In addition, source optics 40 direct light beams 321, 322, and 323 to respective light modulators 501, 502, and 503. More specifically, in one embodiment, source optics 40 split light beam 32 into the colors red, green, and blue. As such, light beam 321 includes a red light beam directed to light modulator 501, light beam 322 includes a green light beam directed to light modulator 502, and light beam 323 includes a blue light beam directed to light modulator 503.

In one embodiment, as described above, image processing unit 20 generates image data subsets 181, 182, and 183 for light modulators 501, 502, and 503, respectively. As such, light modulators 501, 502, and 503 produce respective image portions 521, 522, and 523 based on respective image data subsets 181, 182, and 183. More specifically, light modulators 501, 502, and 503 modulate incident light, such as light beams 321, 322, and 323 to produce image portions 521, 522, and 523 based on respective image data sets 181, 182, and 183.

In one embodiment, light modulators 501, 502, and 503 reproduce respective different colors of image 12. For example, light modulator 501 reproduces red image portions of image 12, light modulator 502 reproduces green image portions of image 12, and light modulator 503 reproduces blue image portions of image 12. As such, image portion 521 includes red image portions of image 12, image portion 522 includes green image portions of image 12, and image portion 523 includes blue image portions of image 12.

In one embodiment, projection optics 60 combine image portions 521, 522, and 523. More specifically, projection optics 60 superimpose or display image portions 521, 522, and 523 in or onto the same area or region. As such, image portions 521, 522, and 523 are displayed to produce displayed image 14. Thus, image portions 521, 522, and 523 are sequentially or simultaneously displayed to produce displayed image 14.

In one embodiment, projection optics 60 direct and/or focus the combined image portions 521, 522, and 523 of displayed image 14. As such, displayed image 14 may be projected to a viewer and/or displayed on a display screen. In one embodiment, projection optics 60 may include one set of projection optics which receive, direct, and/or focus image portions 521, 522, and 523. In another embodiment, projection optics 60 may include respective separate sets of projection optics which each receive, direct, and/or focus respective image portions 521, 522, and 523.

Figure 2C:
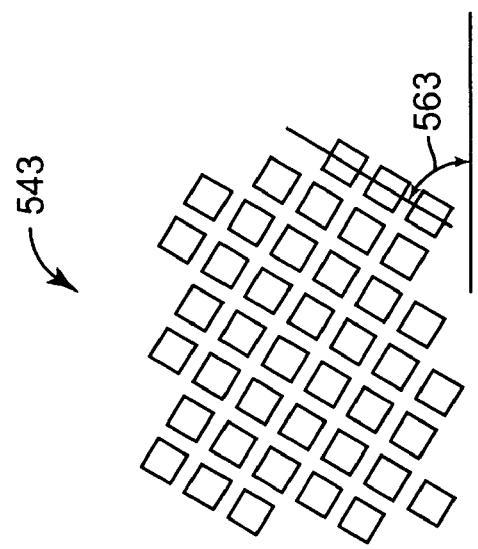
FIGS. 2A, 2B, and 2C are schematic illustrations of one embodiment of pixel arrays of light modulators of the image display system of FIG. 1.
Figure 2B:
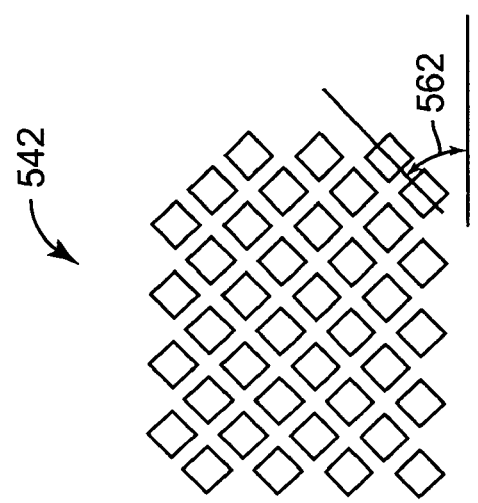
Figure 2A:
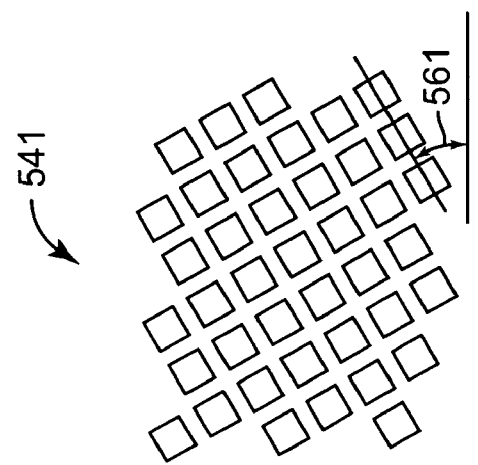

In one embodiment, as illustrated in FIGS. 2A, 2B, and 2C, light modulators 50 each include a matrix or array of cells or pixels. For example, FIG. 2A illustrates one embodiment of a pixel array 541 of one of the light modulators 50, FIG. 2B illustrates one embodiment of a pixel array 542 of another of the light modulators 50, and FIG. 2C illustrates one embodiment of a pixel array 543 of another of the light modulators 50. It is understood that the number of cells or pixels illustrated for each of the pixel arrays 541, 542, and 543 is but a subset of the total number of cells or pixels in each of the respective pixel arrays. In one embodiment, for example, the total number of cells or pixels for each of the pixel arrays may include several thousands of cells or pixels.

As illustrated in the embodiments of FIGS. 2A, 2B, and 2C, pixel arrays 541, 542, and 543 are oriented at respective non-orthogonal angles 561, 562, and 563. More specifically, in one embodiment, pixel arrays 541, 542, and 543 are each oriented at different non-orthogonal angles relative to each other. As such, displayed image portions 521, 522, and 523 produced by respective light modulators 501, 502, and 503 are oriented at different non-orthogonal angles. In one exemplary embodiment, angle 561 of pixel array 541 is approximately 30 degrees, angle 562 of pixel array 542 is approximately 45 degrees, and angle 563 of pixel array 543 is approximately 60 degrees.

Figure 3:
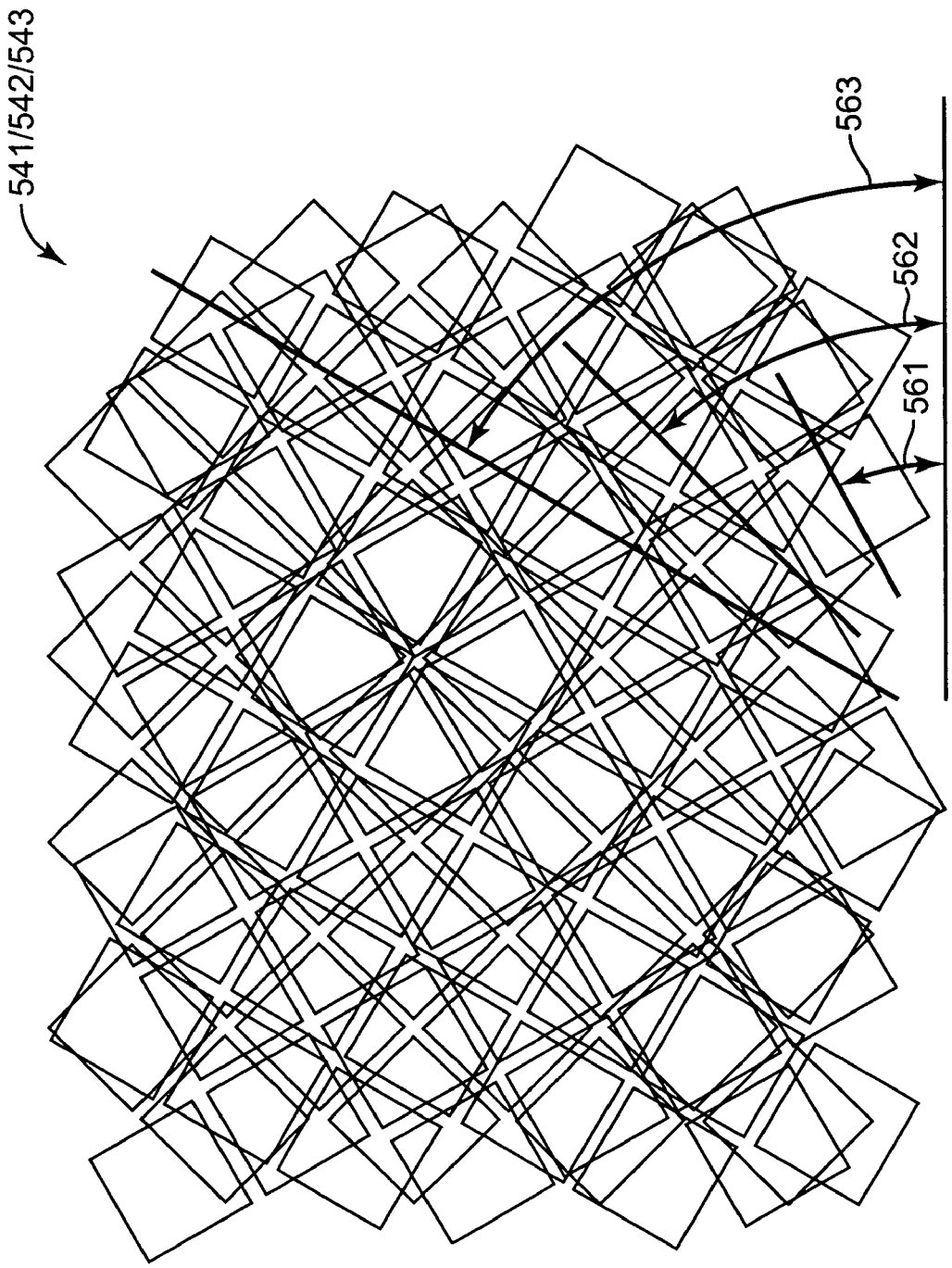
FIG. 3 is a schematic illustration of one embodiment of overlaying the pixel arrays of FIGS. 2A, 2B, and 2C.

In one embodiment, as illustrated in FIG. 3, pixel arrays 541, 542, and 543 are oriented at different non-orthogonal angles 561, 562, and 563, respectively. As such, image portions 521, 522, and 523 produced by respective light modulators 501, 502, and 503 are displayed at different non-orthogonal angles. By orienting the pixel arrays of the light modulators at different non-orthogonal angles, gaps between adjacent pixels of the pixel arrays are not aligned. As such, the "screen door" effect caused, for example, by gaps between adjacent pixels of the pixel arrays is reduced.

In addition, misalignment between the pixel arrays is less noticeable since the pixel arrays are oriented at different non-orthogonal angles.

Figure 4C:
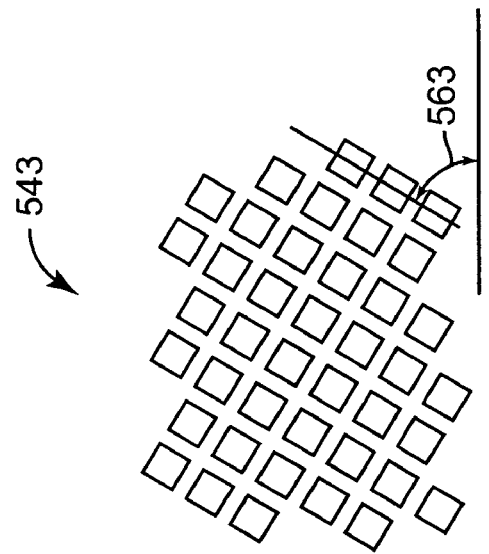
FIGS. 4A, 4B, and 4C are schematic illustrations of another embodiment of pixel arrays of light modulators of the image display system of FIG. 1.
Figure 4B:
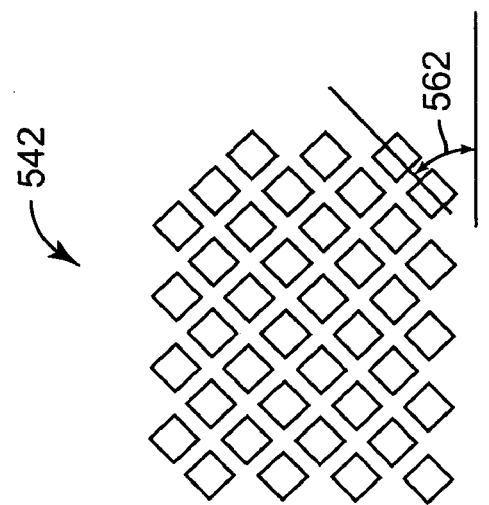
Figure 4A:
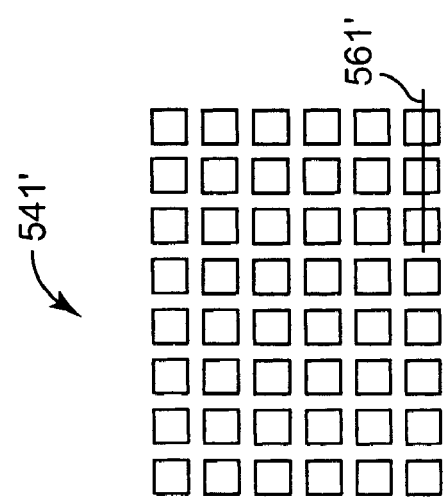

In another embodiment, as illustrated in FIGS. 4A, 4B, and 4C, light modulators 50 include respective pixel arrays 541', 542, and 543. As illustrated in the embodiments of FIGS. 4A, 4B, and 4C, pixel arrays 541', 542, and 543 are oriented at respective different angles 561', 562, and 563. As such, displayed image portions 521, 522, and 523 produced by respective light modulators 501, 502, and 503 are oriented at different angles relative to each other. In one exemplary embodiment, angle 561' of pixel array 541' is approximately zero degrees, angle 562 of pixel array 542 is approximately 45 degrees, and angle 563 of pixel array 543 is approximately 60 degrees.

Figure 5:
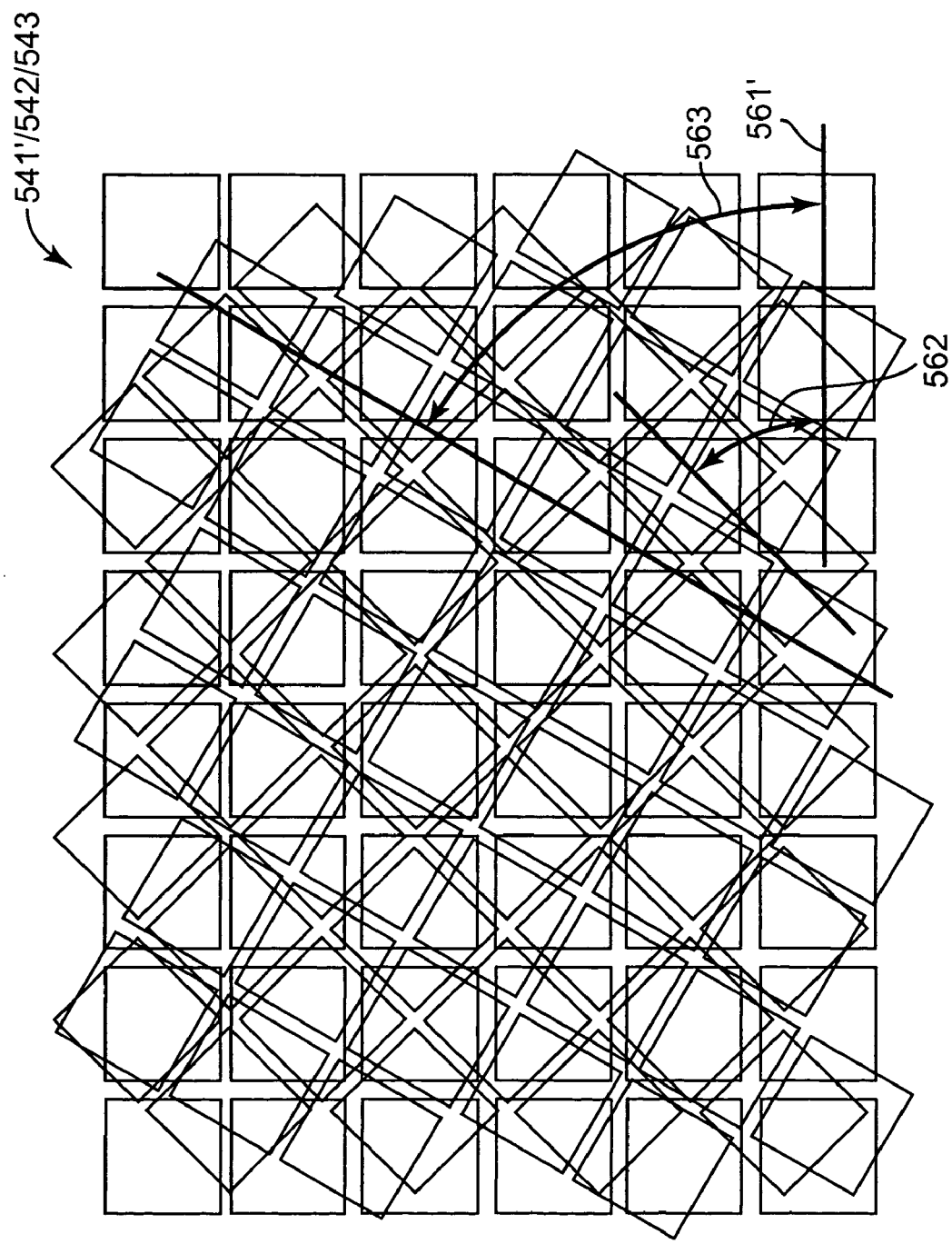
FIG. 5 is a schematic illustration of one embodiment of overlaying the pixel arrays of FIGS. 4A, 4B, and 4C.

As illustrated in the embodiment of FIG. 5, pixel arrays 541', 542, and 543 are oriented at different angles 561', 562, and 563, respectively. As such, image portions 521, 522, and 523 produced by respective light modulators 501, 502, and 503 are displayed at different angles relative to each other. Thus, as described above, the "screen door" effect resulting from gaps between adjacent pixels of the pixel arrays is reduced and misalignment between the pixel arrays is less noticeable since the pixel arrays are oriented at different angles relative to each other.

FIG. 6 illustrates another embodiment of an image display system 10'. In one embodiment, image display system 10', similar to image display system 10, includes image processing unit 20, light source 30, source optics 40, light modulators 50, and projection optics 60. Image display system 10', however, includes light modulators 501 and 502 compared to image display system 10 which includes light modulators 501, 502, and 503 (FIG. 1).

In one embodiment, light modulator 501 produces one color of image 12 and light modulator 502 produces two colors of image 12. More specifically, in one embodiment, light modulator 501 produces red image portions of image 12 and light modulator 502 produces green image portions and blue image portions of image 12. As such, light modulator 501 modulates red light, and light modulator 502 modulates green light and blue light. In addition, as described above, a pixel array of light modulator 501 is oriented at one angle and a pixel array of light modulator 502 is oriented at another angle.

As illustrated in the embodiment of FIG. 4, image display system 10' includes a color wheel 44. In one embodiment, color wheel 44 is provided in a light path between source optics 40 and light modulator 502. As such, light from light source 30 is directed to color wheel 44 by source optics 40.

In one embodiment, color wheel 44 includes separate green and blue color filters. Color wheel 44, therefore, rotates such that green light and blue light alternately pass through color wheel 44 to light modulator 502. As such, light modulator 502 sequentially receives separate light beams 322 and 323 of green and blue light, respectively, while light modulator 501 receives light beam 321 of red light.

In addition, in one embodiment, light modulator 501 receives image data subset 181 representing red image data for image 12 from image processing unit 20, and light modulator 502 receives image data subsets 182 and 183 representing green image data and blue image data for image 12 from image processing unit 20. Accordingly, light modulator 501 produces image portion 521 representing red image portions of image 12, and light modulator 502 alternately produces image portions 522 and 523 representing green image portions and blue image portions, respectively, of image 12. Thus, as described above, projection optics 60 combine image portions 521, 522, and 523 to produce displayed image 14.

While three image portions 521, 522, and 523 are illustrated and described herein as being produced by light modulators 501, 502, and 503, respectively (FIG. 1), or light modulators 501 and 502 (FIG. 6), it is within the scope of the present invention for any number of image portions each oriented at different orthogonal and/or non-orthogonal angles to be produced by any number of light modulators each including a pixel array oriented at respective different angles.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for displaying an image, the system comprising:
    a first light modulator including a first pixel array oriented at a first angle; and
    at least a second light modulator including a second pixel array oriented at a second angle different from the first angle;
    wherein the first pixel array is adapted to produce a first image portion oriented at the first angle, and the second pixel array is adapted to produce a second image portion oriented at the second angle, and
    wherein the first image portion is displayed at the first angle and the second image portion is displayed at the second angle.

2. The system of claim 1, wherein the first angle includes one of approximately zero degrees and approximately 30 degrees, and the second angle includes approximately 45 degrees.

3. The system of claim 1, wherein the first image portion includes a first color of the image, and the second image portion includes a second color and a third color of the image.

4. The system of claim 3, wherein the first color of the image includes red, the second color of the image includes green, and the third color of the image includes blue.

5. The system of claim 1, further comprising:
    a third light modulator including a third pixel array oriented at a third angle different from the first angle and the second angle,
    wherein the third pixel array is adapted to produce a third image portion oriented at the third angle, and
    wherein the first image portion is displayed at the first angle, the second image portion is displayed at the second angle, and the third image portion is displayed at the third angle.

6. The system of claim 5, wherein the first angle includes one of approximately zero degrees and approximately 30 degrees, the second angle includes approximately 45 degrees, and the third angle includes approximately 60 degrees.

7. The system of claim 5, wherein the first image portion includes a first color of the image, the second image portion includes a second color of the image, and the third image portion includes a third color of the image.

8. The system of claim 7, wherein the first color of the image includes red, the second color of the image includes green, and the third color of the image includes blue.

9. The system of claim 1, wherein the first angle includes an orthogonal angle and the second angle includes a non-orthogonal angle.

10. The system of claim 1, wherein the first angle includes a first non-orthogonal angle and the second angle includes a second non-orthogonal angle different from the first non-orthogonal angle.

11. A system for displaying an image, the system comprising:
 a first light modulator including a first pixel array oriented at a first angle; and
 at least a second light modulator including a second pixel array oriented at a second angle different from the first angle,
 wherein the first pixel angle is adapted to produce a first image portion oriented at the first angle, and the second pixel array is adapted to produce a second image portion oriented at the second angle,
 wherein the first image portion and the second image portion are combined to display the image, and
 wherein the first angle includes an orthogonal angle and the second angle includes a non-orthogonal angle.

12. A system for displaying an image, the system comprising:
 a first light modulator including a first pixel array oriented at a first angle; and
 at least a second light modulator including a second pixel array oriented at a second angle different from the first angle;
 wherein the first pixel array is adapted to produce a first image portion oriented at the first angle, and the second pixel array is adapted to produce a second image portion oriented at the second angle,
 wherein the first image portion and the second image portion are combined to display the image, and
 wherein the first angle includes a first non-orthogonal angle and the second angle includes a second non-orthogonal angle different from the first non-orthogonal angle.

13. A system for displaying an image, the system comprising:
 a first light modulator including a first pixel array oriented at a first angle; and
 at least a second light modulator including a second pixel array oriented at a second angle different from the first angle,
 wherein the first pixel array is adapted to produce a first image portion oriented at the first angle, and the second pixel array is adapted to produce a second image portion oriented at the second angle,
 wherein the first image portion and the second image portion are combined to display the image, and
 wherein the first light modulator is adapted to receive a first image data set for the first image portion, and the second light modulator is adapted to receive a second image data set for the second image portion, wherein the first image data set is oriented at the first angle and the second image data set is oriented at the second angle.

14. The system of claim 13, further comprising:
 an image processing unit adapted to receive image data for the image and produce the first image data set at the first angle and the second image data set at the second angle.

15. The system of claim 14, wherein the image data for the image is oriented at an orthogonal angle.

16. A method of displaying an image, the method comprising:
 producing a first image portion with a first pixel array oriented at a first angle;
 producing a second image portion with a second pixel array oriented at a second angle different from the first angle; and
 combining the first image portion and the second image portion to display the image, including displaying the first image portion at the first angle and displaying the second image portion at the second angle.

17. The method of claim 16, wherein the first angle includes one of approximately zero degrees and approximately 30 degrees, and the second angle includes approximately 45 degrees.

18. The method of claim 16, wherein producing the first image portion includes displaying a first color of the image, and producing the second image portion includes displaying a second color and a third color of the image.

19. The method of claim 18, wherein the first color of the image includes red, the second color of the image includes green, and the third color of the image includes blue.

20. The method of claim 16, further comprising:
 producing a third image portion with a third pixel array oriented at a third angle different from the first angle and the second angle; and
 combining the first image portion, the second image portion, and the third image portion to display the image, including displaying the first image portion at the first angle, displaying the second image portion at the second angle, and displaying the third image portion at the third angle.

21. The method of claim 20, wherein the first angle includes one of approximately zero degrees and approximately 30 degrees, the second angle includes approximately 45 degrees, and the third angle includes approximately 60 degrees.

22. The method of claim 20, wherein producing the first image portion includes displaying a first color of the image, producing the second image portion includes displaying a second color of the image, and producing the third image portion includes displaying a third color of the image.

23. The method of claim 22, wherein the first color of the image includes red, the second color of the image includes green, and the third color of the image includes blue.

24. The method of claim 16, wherein the first angle includes an orthogonal angle and the second angle includes a non-orthogonal angle.

25. The method of claim 16, wherein the first angle includes a first non-orthogonal angle and the second angle includes a second non-orthogonal angle different from the first non-orthogonal angle.

26. A method of displaying an image, the method comprising;
 producing a first image portion with a first pixel array oriented at a first angle;
 producing a second image portion with a second pixel array oriented at a second angle different from the first angle; and
 combining the first image portion and the second image portion to display the image,
 wherein the first angle includes an orthogonal angle and the second angle includes a non-orthogonal angle.

27. A method of displaying an image, the method comprising:
  producing a first image portion with a first pixel array oriented at a first angle;
  producing a second image portion with a second pixel array oriented at a second angle different from the first angle; and
  combining the first image portion and the second image portion to display the image,
  wherein the first angle includes a first non-orthogonal angle and the second angle includes a second non-orthogonal angle different from the first non-orthogonal angle.

28. A method of displaying an image, the method comprising:
  producing a first image portion with a first pixel array oriented at a first angle;
  producing a second image portion with a second pixel array oriented at a second angle different from the first angle; and
  combining the first image portion and the second image portion to display the image, the method further comprising:
  receiving a first image data set oriented at the first angle for the first image portion; and
  receiving a second image data set oriented at the second angle for the second image portion.

29. The method of claim 28, further comprising:
  receiving image data for the image;
  producing the first image data set for the first image portion from the image data, including orienting the first image data set at the first angle; and
  producing the second image data set for the second image portion from the image data, including orienting the second image data set at the second angle.

30. The method of claim 29, wherein the image data for the image is oriented at an orthogonal angle.

31. A system for displaying an image, the system comprising:
  means for producing a first image portion oriented at a first angle;
  means for producing a second image portion oriented at a second angle different from the first angle; and
  means for displaying the first image portion at the first angle and the second image portion at the second angle.

32. The system of claim 31, wherein means for producing the first image portion includes a first light modulator including a first pixel array oriented at the first angle, and means for producing the second image portion includes a second light modulator including a second pixel array oriented at the second angle.

33. The system of claim 31, wherein means for producing the first image portion includes means for displaying a first color of the image, and means for producing the second image portion includes means for displaying a second color and a third color of the image.

34. The system of claim 31, further comprising:
  means for producing a third image portion oriented at a third angle different from the first angle and the second angle; and
  means for displaying the first image portion at the first angle, the second image portion at the second angle, and the third image portion at the third angle.

35. The system of claim 34, wherein means for producing the first image portion includes a first light modulator including a first pixel array oriented at the first angle, means for producing the second image portion includes a second light modulator including a second pixel array oriented at the second angle, and means for producing the third image portion includes a third light modulator including a third pixel array oriented at the third angle.

36. The system of claim 34, wherein means for producing the first image portion includes means for displaying a first color of the image, means for producing the second image portion includes means for displaying a second color of the image, and means for producing the third image portion includes means for displaying a third color of the image.

37. The system of claim 31, wherein the first angle includes an orthogonal angle and the second angle includes a non-orthogonal angle.

38. The system of claim 31, wherein the first angle includes a first non-orthogonal angle and the second angle includes a second non-orthogonal angle different from the first non-orthogonal angle.

* * * * *

UNITED STATES PATENT AND TRADEMARK OFFICE
CERTIFICATE OF CORRECTION

PATENT NO. : 6,927,890 B2
DATED : August 9, 2005
INVENTOR(S) : Allen

It is certified that error appears in the above-identified patent and that said Letters Patent is hereby corrected as shown below:

<u>Column 7,</u>
Line 18, delete "angle" and insert -- array --.

Signed and Sealed this

Twenty-seventh Day of December, 2005

JON W. DUDAS
*Director of the United States Patent and Trademark Office*